US 9,232,161 B2

(12) United States Patent
Suh et al.

(10) Patent No.: US 9,232,161 B2
(45) Date of Patent: Jan. 5, 2016

(54) UNIT PIXELS CONFIGURED TO OUTPUT DIFFERENT PIXEL SIGNALS THROUGH DIFFERENT LINES AND IMAGE SENSORS INCLUDING THE SAME

(71) Applicant: Samsung Electronics Co., Ltd., Suwon-Si, Gyeonggi-Do (KR)

(72) Inventors: Sung-Ho Suh, Hwaseong-si (KR); Kwi-Sung Yoo, Seoul (KR); Seung-Hyun Lim, Yongin-si (KR); Seog-Heon Ham, Suwon-si (KR); Kang-Sun Lee, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/206,126

(22) Filed: Mar. 12, 2014

(65) Prior Publication Data
US 2014/0267861 A1    Sep. 18, 2014

(30) Foreign Application Priority Data

Mar. 12, 2013    (KR) .................. 10-2013-0026291

(51) Int. Cl.
*H04N 5/357*    (2011.01)
*H04N 5/374*    (2011.01)
*H04N 5/378*    (2011.01)
*H04N 9/04*    (2006.01)
*H04N 5/3745*    (2011.01)

(52) U.S. Cl.
CPC ............. *H04N 5/3575* (2013.01); *H04N 5/378* (2013.01); *H04N 5/37457* (2013.01); *H04N 9/045* (2013.01)

(58) Field of Classification Search
CPC .. H04N 5/3575; H04N 5/378; H04N 5/37457
USPC .......................................................... 348/308
See application file for complete search history.

(56) References Cited

U.S. PATENT DOCUMENTS

| | | |
|---|---|---|
| 2005/0068434 A1 | 3/2005 | Hatano |
| 2006/0125943 A1 | 6/2006 | Parks |
| 2010/0283881 A1 | 11/2010 | Araki et al. |
| 2010/0309351 A1 | 12/2010 | Smith et al. |
| 2011/0134297 A1* | 6/2011 | Takeda ..................... 348/302 |
| 2011/0221941 A1 | 9/2011 | Sato |
| 2012/0133800 A1* | 5/2012 | Jung et al. ................. 348/241 |
| 2012/0188424 A1* | 7/2012 | Li .............................. 348/294 |
| 2013/0050554 A1* | 2/2013 | Mabuchi .................... 348/311 |

* cited by examiner

*Primary Examiner* — Gevell Selby
(74) *Attorney, Agent, or Firm* — Harness, Dickey & Pierce, P.L.C.

(57) ABSTRACT

An image sensor includes a pixel array and a plurality of pairs of column lines. The pixel array includes a plurality of unit pixel areas arranged in a plurality of rows and columns. Each of the unit pixel areas includes a readout circuit connected to a corresponding pair of column lines, and first and second photo-electric conversion devices sharing the readout circuit. Each of the unit pixel areas is configured to output a first pixel signal corresponding to a photoelectron generated by the first photo-electric conversion device through the first column line, and to output a second pixel signal corresponding to a photoelectron generated by the second photo-electric conversion device through the second column line.

13 Claims, 10 Drawing Sheets

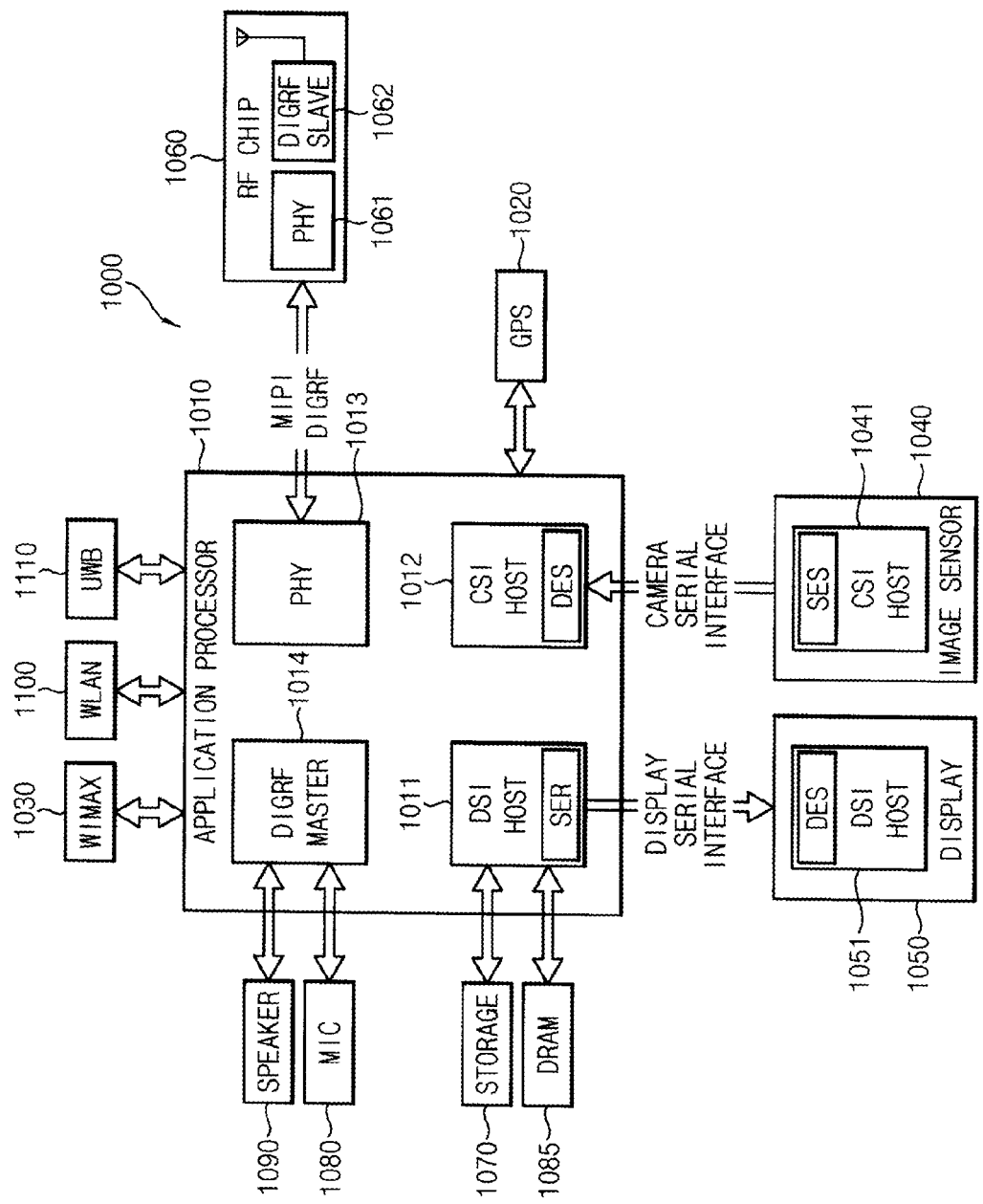

UNIT PIXELS CONFIGURED TO OUTPUT DIFFERENT PIXEL SIGNALS THROUGH DIFFERENT LINES AND IMAGE SENSORS INCLUDING THE SAME

CROSS-REFERENCE TO RELATED APPLICATION

This application claims priority under 35 U.S.C. §119 to Korean Patent Application No. 10-2013-0026291, filed on Mar. 12, 2013, in the Korean Intellectual Property Office (KIPO), the contents of which are herein incorporated by reference in their entirety.

BACKGROUND

1. Technical Field

Example embodiments relate generally to image sensors, and more particularly image sensors including a plurality of unit pixel arrays where two pixels share one readout circuit.

2. Description of the Related Art

In general, a complementary-metal-oxide-semiconductor (CMOS) image sensor is a device used in a smart phone or a digital still camera to capture an image and the CMOS image sensor is required to be manufactured in a small size according to the tendency of portable devices manufactured in a small size with a slim structure.

As image sensors have tended toward the miniaturization, a size of a unit pixel area is reduced so that the fill-factor (a ratio of a photodiode area to a unit pixel area) is also reduced.

For this reason, recently, a shared pixel structure allowing two photodiodes to share one readout circuit has been adopted to reduce an area of switch transistors per a unit pixel.

In the shared pixel structure, the minimization for a 1H period is necessary for a high frame rate, but there is limitation in the minimization due to the restriction of pixel charge transmission and A/D conversion time. In order to overcome the above limitation, a 2RSR (2 Row Simultaneously Read) scheme is employed to simultaneously read 2 rows for the 1H period.

However, when the 2RSR scheme is used, if photodiodes having mutually different colors share one column line through one readout circuit, mismatch may occur between colors.

SUMMARY

Some example embodiments provide an image sensor capable of suppressing and/or preventing mismatch between colors by allowing mutually different colors to be output through mutually different column lines when two rows are read simultaneously and/or concurrently.

According to example embodiments, an image sensor includes: a pixel array, and a plurality of pairs of column lines. The pixel array includes a plurality of unit pixel areas aligned as a plurality of rows and columns. Each of the unit pixel areas includes: a (e.g., a single) readout circuit connected to a corresponding pair of column lines, and first and second photo-electric conversion devices sharing the readout circuit. Each of the unit pixel areas is configured to output a first pixel signal corresponding to a first photoelectron generated by the first photo-electric conversion device through the first column line, and to output a second pixel signal corresponding to a second photoelectron generated by the second photo-electric conversion device through the second column line.

In example embodiments, the first photoelectron may correspond to a first color and the second photoelectron may correspond to a second color, which is different from the first color.

Each readout circuit aligned in an odd row of the plurality of rows may output the first pixel signal through the first column line in response to an odd readout signal, and each readout circuit aligned in an even row of the plurality of rows may output the second pixel signal through the second column line in response to the odd readout signal.

Each readout circuit aligned in an even row of the plurality of rows may output the first pixel signal through the first column line in response to an even readout signal, and each readout circuit aligned in an odd row of the plurality of rows may output the second pixel signal through the second column line in response to the even readout signal.

Each unit pixel area aligned in an odd row of the plurality of rows may include a first charge transmit transistor is configured to transmit a photo charge generated by the first photo-electric conversion device to a shared node when an odd readout operation is performed, and a second charge transmit transistor configured to transmit a photo charge generated from the second photo-electric conversion device to the shared node when an even readout operation is performed. The readout circuit included in each unit pixel area aligned in the odd row of the plurality of rows may include: a reset transistor configured to reset the shared node with a supply voltage in response to a reset signal; a drive transistor configured to drive an output node based on quantity of charges at the shared node; a first select transistor configured to connect the output node to the first column line in response to an odd readout signal, and a second select transistor configured to connect the output node to the second column line in response to an even readout signal.

Each unit pixel area aligned in an even row of the plurality of rows may include a first charge transmit transistor configured to transmit a photo charge generated by the first photo-electric conversion device to a shared node when an even readout operation is performed, and a second charge transmit transistor configured to transmit a photo charge generated from the second photo-electric conversion device to the shared node when an odd readout operation is performed. The readout circuit included in each unit pixel area aligned in the even row of the plurality of rows may include: a reset transistor configured to reset the shared node with a supply voltage in response to a reset signal; a drive transistor configured to drive an output node based on quantity of charges at the shared node; a third select transistor configured to connect the output node to the first column line in response to an even readout signal, and a fourth select transistor configured to connect the output node to the second column line in response to an odd readout signal.

According to example embodiments, an image sensor includes: a pixel array including a plurality of unit pixel areas arranged in a plurality of rows and columns; and a plurality of pairs of column lines, each pair of column lines being aligned in a column among the plurality of columns. Each of the plurality of unit pixel areas includes: a readout circuit connected to a corresponding pair of column lines; and first and second photo-electric conversion devices sharing the readout circuit. Each of the plurality of unit pixel areas arranged in an odd row among the plurality of rows is configured to output first and second pixel signals corresponding to photoelectrons generated by the first and second photo-electric conversion devices through a first column line among the corresponding pair of column lines; and each of the plurality of unit pixel areas arranged in an even row among the plurality of rows is configured to output the first and second pixel signals corresponding to the photoelectrons generated by the first and second photo-electric conversion devices through a second column line among the corresponding pair of column lines.

According to some example embodiments, the first photo-electric conversion devices of unit pixel areas in the even row may be between the first and second photo-electric conversion devices of corresponding unit pixel areas in the odd row, and the second photo-electric conversion devices of the corresponding unit pixel areas in the odd row may be between the first and second photo-electric conversion devices of the unit pixel areas in the even row.

The first and second photo-electric conversion devices of the corresponding unit pixel areas in the odd row may be configured to generate photoelectrons corresponding to a first color, and the first and second photo-electric conversion devices of the corresponding unit pixel areas in the even row may be configured to generate photoelectrons corresponding to a second color, which is different from the first color.

Each readout circuit in the odd row may be configured to output the first pixel signal through the first column line in response to an odd readout signal, and each readout circuit in the even row may be configured to output the first pixel signal through the second column line in response to the odd readout signal.

Each readout circuit in the odd row may be configured to output the second pixel signal through the first column line in response to an even readout signal, and each readout circuit in the even row may be configured to output the second pixel signal through the second column line in response to the even readout signal.

Each unit pixel area may include: a first charge transmit transistor configured to transmit a photo charge generated by the first photo-electric conversion device to a shared node when an odd readout operation is performed; and a second charge transmit transistor configured to transmit a photo charge generated by the second photo-electric conversion device to the shared node when an even readout operation is performed.

The readout circuit included in each unit pixel area may include: a reset transistor configured to reset the shared node with a supply voltage in response to a reset signal; a drive transistor configured to drive an output node based on quantity of charges at the shared node; and a select transistor configured to connect the output node to one of the first and second column lines in response to a select signal. The select transistor in the readout circuit included in each unit pixel area in the odd row may be configured to connect the output node to the first column line in response to the select signal, and the select transistor in the readout circuit included in each unit pixel area in the even row may be configured to connect the output node to the second column line in response to the select signal.

According to example embodiments, a unit pixel having a shared pixel structure includes: a first photo-electric conversion device configured to generate a first pixel signal corresponding to a first color; a second photo-electric conversion device configured to generate a second pixel signal corresponding to a second color, which is different from the first color; and a readout circuit connected to the first and second photo-electric devices, the readout circuit being configured to output the first pixel signal and the second pixel signal via different column lines.

The first and second photo-electric conversion devices may share the readout circuit. The unit pixel may include only a single readout circuit.

According to example embodiments an image sensor includes: a pixel array including a plurality of the unit pixels arranged in a plurality of rows and columns; and a plurality of pairs of column lines, each pair of column lines being aligned with a column among the plurality of columns. Each unit pixel has a shared pixel structure and includes: a first photo-electric conversion device configured to generate a first pixel signal corresponding to a first color; a second photo-electric conversion device configured to generate a second pixel signal corresponding to a second color, which is different from the first color; and a readout circuit connected to the first and second photo-electric devices, the readout circuit being configured to output the first pixel signal and the second pixel signal via different column lines. The readout circuit is configured to output the first pixel signal to the first column line among a corresponding pair of column lines, and to output the second pixel signal via the second column line among the corresponding pair of column lines.

The readout circuit may be configured to output the first pixel signal only via the first column line, and to output the second pixel signal only via the second column line.

BRIEF DESCRIPTION OF THE DRAWINGS

Illustrative, non-limiting example embodiments will be more clearly understood from the following detailed description taken in conjunction with the accompanying drawings.

FIG. 9 is a block diagram illustrating a computing system and an interface used in the computing system according to an example embodiment.

DETAILED DESCRIPTION

Figure 1A:
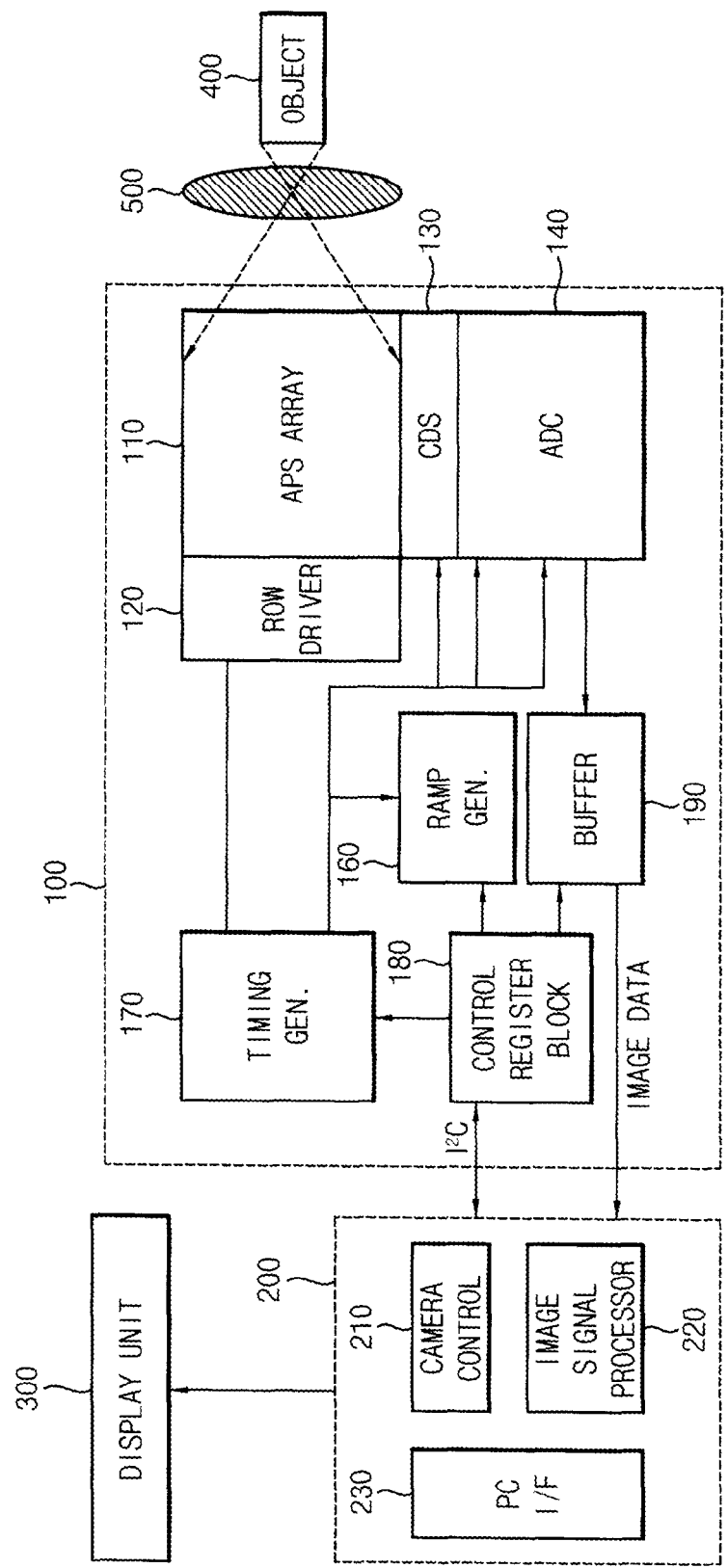
FIG. 1a is a schematic block diagram illustrating an image sensor according to an example embodiment.

Various example embodiments will be described more fully with reference to the accompanying drawings, in which some example embodiments are shown. The present inventive concepts may, however, be embodied in many different forms and should not be construed as limited to the embodiments set forth herein. Rather, these embodiments are provided so that this disclosure will be thorough and complete, and will fully convey the scope of the present inventive concepts to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1a is a schematic block diagram illustrating an image sensor according to an example embodiment.

Referring to FIG. 1a, the image sensor 100 according to the example embodiment includes an active pixel array (APS array) 110, a row driver 120, a correlated double sample (CDS) block 130, an analog digital converter (ADC) 140, a ramp generator 160, a timing generator 170, a control register block 108 and a buffer 190.

The image sensor 100 may sense an object 400 photographed through a lens 500 under the control of a digital signal processor (DSP) 200 and the DSP 200 may output an image sensed by the image sensor 100 to a display unit 300. The display unit 300 may include various types of devices capable of outputting the image. For instance, the display unit 300 may include a computer, a portable phone and other image output terminals.

The DSP 200 includes a camera control 210, an image signal processor 220 and a PC I/F 230. The camera control 210 controls the control register block 180. The camera control 210 may control the image sensor 100, that is, the control register block 180 by using an I²C (Inter-integrated circuit), but the example embodiments are not limited thereto.

The image signal processor 220 receives image data, which are output signals of the buffer 190, to process/treat the image suitably for eyes of persons and outputs the processed/treated image to the display unit 300 through the PC I/F 230.

Although the image signal processor 220 is illustrated as it is positioned in the DSP 200 in FIG. 1a, the position of the image signal processor 220 may be changed by those skilled in the art. For instance, the image signal processor 220 may be positioned in the image sensor 100.

The active pixel array 110 includes a plurality of photo sensing devices, such as photodiodes or pinned photodiodes. The active pixel array 110 detects light by using the photo sensing devices and generates an image signal by converting the light into an electric signal. The active pixel array 110 includes a plurality of rows and columns and unit pixel areas are aligned in the form of a matrix. In the unit pixel area, two color pixels share one readout circuit.

The timing generator 170 may output control signals to the row driver 120, the ADC 140 and the ramp generator 160, respectively, to control the operations of the row driver 120, the ADC 140 and the ramp generator 160. The control register block 180 may generate control signals to the ramp generator 160, the timing generator 170 and the buffer 190 to control the operations of the ramp generator 160, the timing generator 170 and the buffer 190. The control register block 180 may be operated under the control of the camera control 210.

The row driver 120 drives the active pixel array 110 in a unit of row. For instance, the row driver 120 may generate a row select signal. The row driver 120 may include a shift register or an address decoder and selectively scans in a unit of horizontal line in response to vertical and horizontal synchronous signals. A reset signal, a transfer signal and a select signal may be output to a reset line, a transfer line and a select line, respectively, in every horizontal line.

In addition, the active pixel array 110 outputs the reset signal and an image signal to the CDS block 130 from a row selected by the row select signal supplied from the row driver 120.

Upon receiving the reset signal and the image signal, the CDS block 130 may perform the correlated double sampling with respect to the reset signal and the image signal.

The ADC 140 compares a ramp signal Vramp supplied from the ramp generator 160 with a correlated double sampling signal output from the CDS block 130, generates a result signal and counts the result signal to output the count value to the buffer 190.

The buffer 190 temporarily stores a digital signal output from the ADC 130 and outputs the digital signal by sensing and amplifying the digital signal. In order to temporarily store the digital signal, the buffer 190 may include a plurality of column memory blocks (for instance, SRAM) each of which is included in each row and a sense amplifier SA to sense and amplify the digital signal output from and the ADC 130.

Pixel signals, which are processed in each pixel row, may be sequentially output from the CDS block 130, the ADC 140 and the buffer 190. In addition, a give, desired or predetermined signal processing may be performed with respect to analog pixel signals output from each pixel of two rows which are simultaneously selected.

Figure 1B:
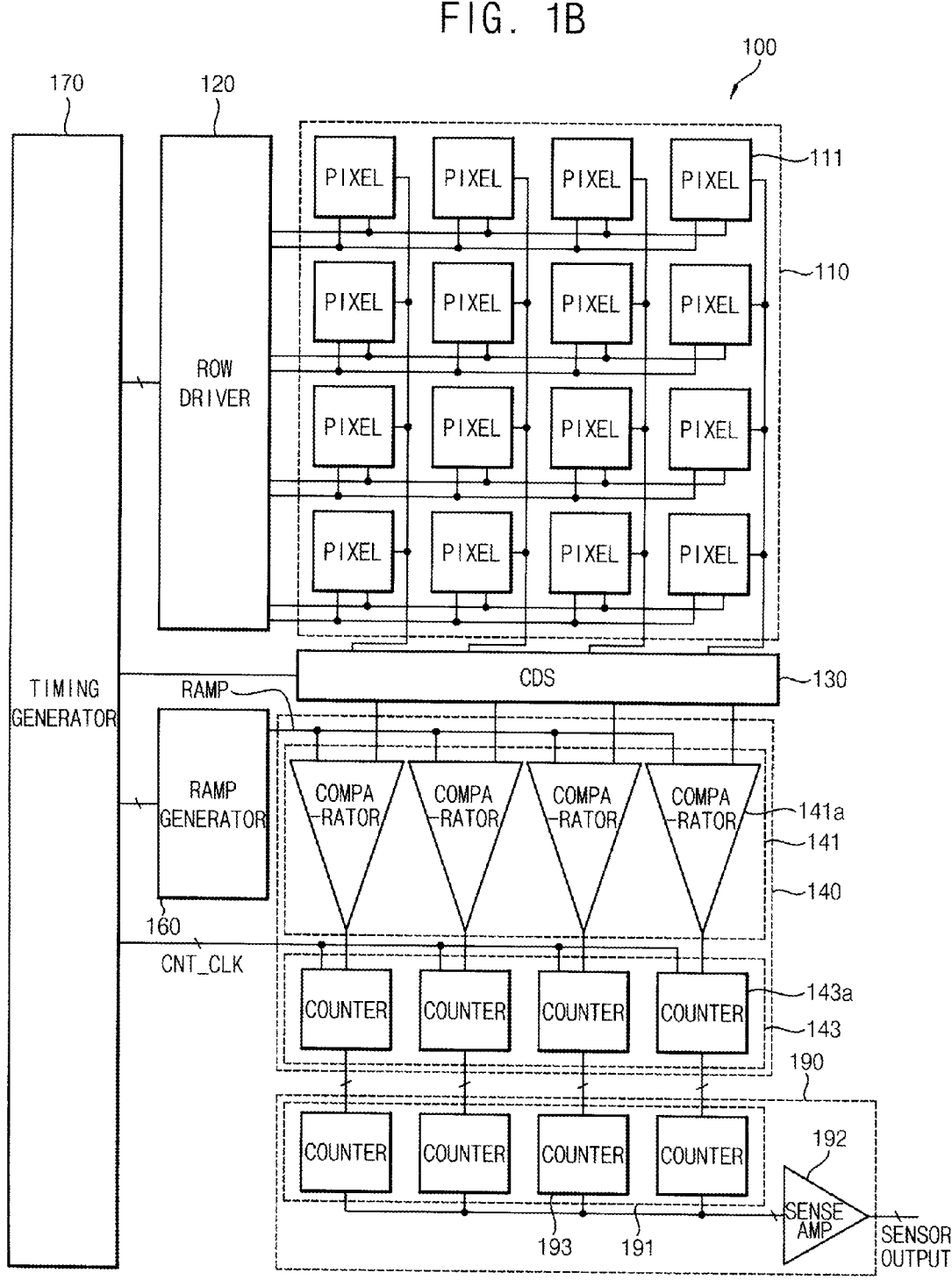
FIG. 1b is a detailed block diagram illustrating the image sensor according to an example embodiment.

FIG. 1b is a detailed block diagram illustrating the image sensor according to an example embodiment.

Referring to FIG. 1b, the image sensor 100 according to the example embodiment includes the active pixel array 110, the row driver 120, the analog digital converter 140, the ramp generator 160, the timing generator 170, and the buffer 190. The analog digital converter 140 includes a comparator block 141 and a counter block 143.

The active pixel array 110 may include a plurality of pixels 111 connected to a plurality of row lines and column lines and aligned in the form of a matrix.

Each of the pixels 111 may include a red pixel to convert light having a red spectrum band into an electric signal, a green pixel to convert light having a green spectrum band into the electric signal, and a blue pixel to convert light having a blue spectrum band into the electric signal.

In addition, color filter arrays may be aligned on the pixels 111 constituting the active pixel array 110, respectively, to allow light having a specific spectrum band to pass there through.

The row driver 120 may decode the row control signal (e.g., address signal) generated from the timing generator 170 to select one of row lines constituting the active pixel array 110 in response to the decoded row control signal.

The CDS block 130 may perform the correlated double sampling with respect to the pixel signal output from a unit pixel connected to one of column lines constituting the active pixel array 110.

The comparator block 141 includes a plurality of comparators 141a connected to the CDS block 130 and the ramp generator 160. In this case, the CDS block 130 may be connected to a first input terminal of the comparator 141a and the ramp generator 160 may be connected to a second input terminal of the comparator 141a.

The comparator 141a receives a value of an output signal of the CDS block 140 and a value of the ramp signal of the ramp generator 160, compares the values with each other and outputs a comparison result signal through an output terminal. At this time the comparison result signal output from the comparator 141a may correspond to the differential value between the image signal and the reset signal, which may vary depending on the intensity of illumination of external light, and the ramp signal is used to output the difference between the image signal and the reset signal so that the difference between the image signal and the reset signal may be detected and output according to the slope of the ramp signal. The ramp generator 160 may operate based on the control signal generated from the timing generator 170.

The counter block 143 includes a plurality of counters 143a connected to the output terminals of the comparators 141a, respectively, to output the digital signal by counting the comparison result signal according to the clock CNT_CLK input from the timing generator 170. The clock CNT_CLK may be generated by a counter controller (not shown) provided in the counter block 143 or the timing generator 170 based on a counter control signal generated from the timing generator 170.

The counter 143a may include an up/down counter and a bit-wise inversion counter. The bit-wise inversion counter may operate similarly to the up/down counter. For instance, the bit-wise inversion counter may have a function of up-counting as well as a function of making 1's complement by inversing all bits in the counter when a specific signal is input. Thus, the bit-wise inversion counter can perform the reset count and can convert the reset count into 1's complement, that is, a minus value, by inversing the reset count.

The buffer 190 includes a column memory block 191 and a sense amplifier 192, and the column memory block 191 includes a plurality of memories 193.

The memories 193 may operate according to a memory control signal generated from a memory controller (not shown) installed in the column memory block 191 or the timing generator 170 based on the control signal generated from the timing generator 170. The memory 193 may include an SRAM.

The column memory block 191 temporarily stores the digital signal output from the counters 143a and outputs the digital signal to the sense amplifier 192 according to the memory control signal and the sense amplifier 192 outputs the digital signal by sensing and amplifying the digital signal.

Figure 2:
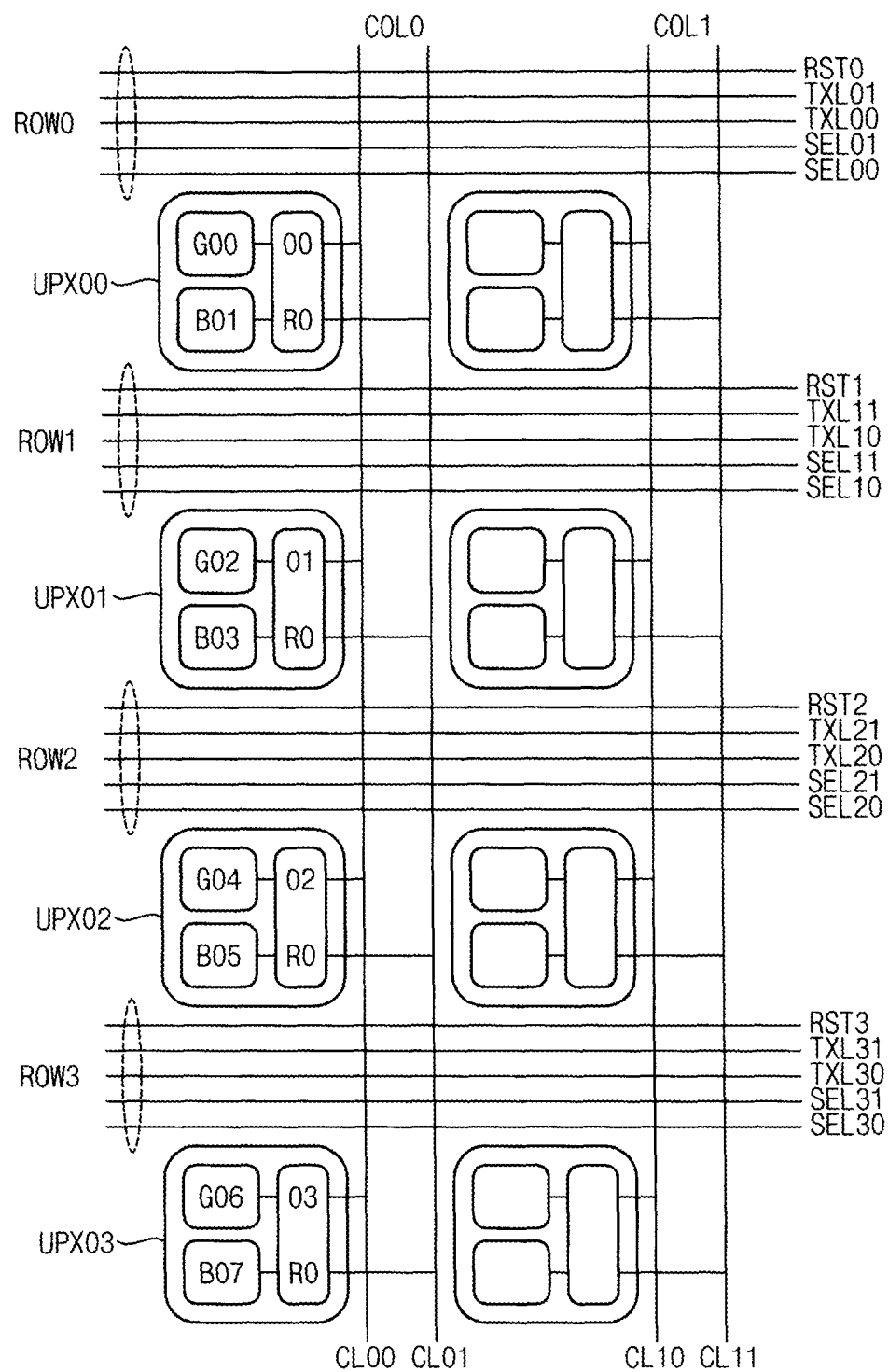
FIG. 2 is a view illustrating a portion of a pixel array unit according to an example embodiment.
Figure 3:
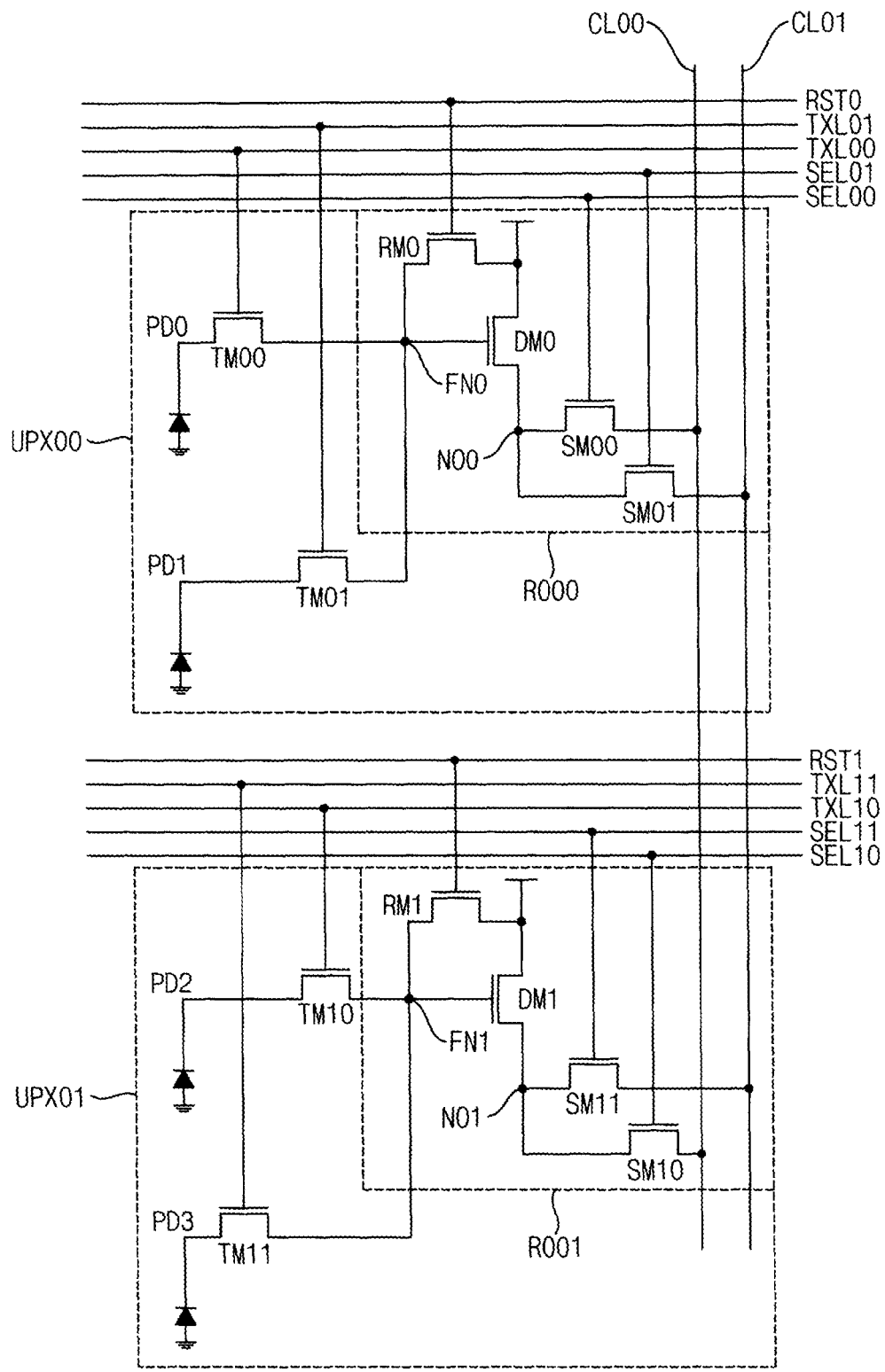
FIG. 3 is a circuit diagram illustrating an equivalent circuit corresponding to a first row and a second row of the pixel array unit of FIG. 2.

FIG. 2 is a view illustrating a portion of the active pixel array unit 110 according to an example embodiment. FIG. 3 is a circuit diagram illustrating an equivalent circuit corresponding to a first row and a second row of the pixel array unit of FIG. 2.

Referring to FIG. 2, a first row ROW0 includes a reset line RST0, a first charge transmit line TXL00, a second charge transmit line TXL01, a first select line SEL00 and a second select line SEL01. In the same way, a second row ROW1 includes a reset line RST1, a first charge transmit line TXL10, a second charge transmit line TXL11, a first select line SEL10 and a second select line SEL11, a third row ROW2 includes a reset line RST2, a first charge transmit line TXL20, a second charge transmit line TXL21, a first select line SEL20 and a second select line SEL21, and a fourth row ROW3 includes a reset line RST3, a first charge transmit line TXL30, a second charge transmit line TXL31, a first select line SEL30 and a second select line SEL31.

A first column CoL0 includes a first column line CL00 and a second column line CL01 and a second column CoL1 includes a first column line CL10 and a second column line CL11.

Unit pixel areas UPX00 to UPX03 are disposed at intersections between the first column CoL0 and the first to fourth rows ROW0 to ROW3.

The unit pixel area UPX00 includes a green pixel G00, a blue pixel B01 and a readout circuit RO00, the unit pixel area UPX01 includes a green pixel G02, a blue pixel B03 and a readout circuit RO01, the unit pixel area UPX02 includes a green pixel G04, a blue pixel B05 and a readout circuit RO02, and the unit pixel area UPX03 includes a green pixel G06, a blue pixel B07 and a readout circuit RO03.

Referring to FIG. 3, the odd unit pixel area UPX00 includes two photo-electric conversion devices, that is, photodiodes PD0 and PD1. The photodiode PD0 converts light received from the green pixel G00 into a photo charge and the photodiode PD1 converts light received from the blue pixel B01 into the photo charge. The photo charge having the green color generated from the photodiode PD0 is transmitted to the readout circuit RO00 through a charge transmit transistor TM00 and the photo charge having the blue color generated from the photodiode PD1 is transmitted to the readout circuit RO00 through a charge transmit transistor TM01. The charge transmit transistor TM00 has a gate connected to the first charge transmit line TXL00 and the charge transmit transistor TM01 has a gate connected to the second charge transmit line TXL01, so the charge transmit transistors TM00 and TM01 are selectively switched.

The readout circuit RO00 includes a shared node FN0, a reset transistor RM0, a drive transistor DM0, a first select transistor SM00 and a second select transistor SM01. The reset transistor RM0 has a source connected to a power supply terminal, a drain connected to the shared node FN0 and a gate connected to the reset line RST0. The drive transistor DM0 has a source connected to the power supply terminal, a drain connected to an output node NO0 and a gate connected to the shared node FN0. The first select transistor SM00 has a source connected to the output node NO0, a drain connected to the first column line CL00 and a gate connected to the first select line SEL00. The second select transistor SM01 has a source connected to the output node NO0, a drain connected to the second column line CL01 and a gate connected to the second select line SEL01. The first and second select transistors SM00 and SM01 are selectively switched with each other.

An even unit pixel area UPX01 includes two photo-electric conversion devices, that is, photodiodes PD2 and PD3. The photodiode PD2 converts light received from the green pixel G02 into a photo charge having a green color and the photodiode PD3 converts light received from the blue pixel B03 into the photo charge having a blue color. The photo charge having the green color generated from the photodiode PD2 is transmitted to the readout circuit RO01 through a charge transmit transistor TM10 and the photo charge having the blue color generated from the photodiode PD3 is transmitted to the readout circuit RO01 through a charge transmit transistor TM11. The charge transmit transistor TM10 has a gate connected to the first charge transmit line TXL10 and the charge transmit transistor TM11 has a gate connected to the second charge transmit line TXL11, so the charge transmit transistors TM10 and TM11 are selectively switched.

The readout circuit RO01 includes a shared node FN1, a reset transistor RM1, a drive transistor DM1, a first select transistor SM10 and a second select transistor SM11. The reset transistor RM1 has a source connected to a power supply terminal, a drain connected to the shared node FN1 and a gate connected to the reset line RST1. The drive transistor DM1 has a source connected to the power supply terminal, a drain connected to an output node NO1 and a gate connected to the shared node FN1. The first select transistor SM10 has a source connected to the output node NO1, a drain connected to the first column line CL00 and a gate connected to the first select line SEL10. The second select transistor SM11 has a source connected to the output node NO1, a drain connected to the second column line CL01 and a gate connected to the second select line SEL11. The first and second select transistors SM10 and SM11 are selectively switched with each other.

Figure 4:
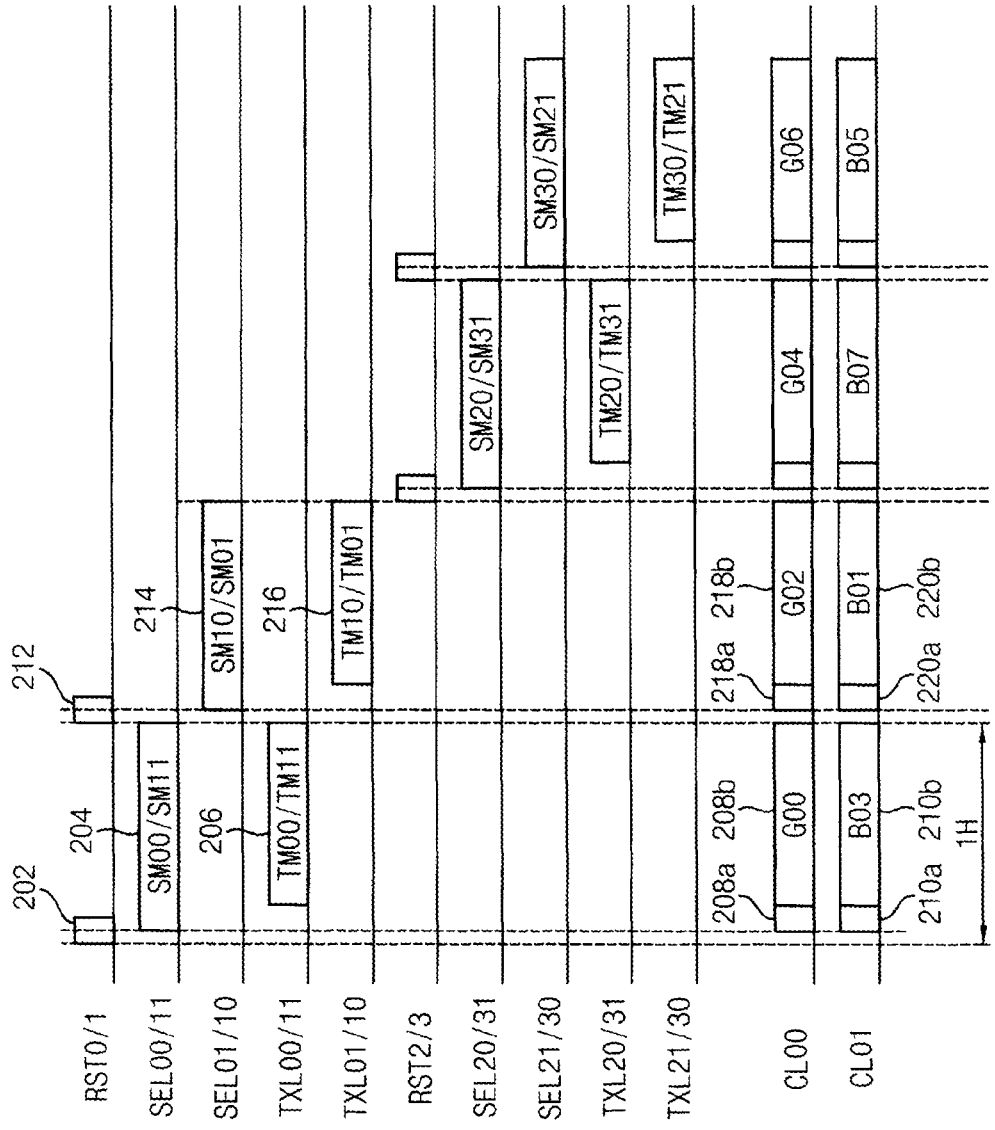
FIG. 4 is an example timing chart to explain example operation of the equivalent circuit of FIG. 3.

FIG. 4 is an example timing chart to explain example operation of the equivalent circuit of FIG. 3.

Referring to FIG. 4, if a reset pulse signal 202 is applied to the gates of the reset transistors RM0 and RM1 through the reset lines RST0 and RST1 during a first horizontal period, the shared nodes FN0 and FN1 are concurrently charged with a supply voltage. Thus, the drive transistors DM0 and DM1 are turned on so that a reset voltage signal is output to the output nodes NO0 and NO1. Then, if a select signal 204 is applied to the gates of the select transistors SM00 and SM11 through the first select line SEL00 of the readout circuit RO00 of the odd row ROW0 and the second select line SEL11 of the readout circuit RO01 of the even row ROW1, the select transistors SM00 and SM11 are concurrently turned on. Thus, a reset voltage signal 208a of the output node NO0 is output to the column line CL00 and a reset voltage signal 210a of the output node NO1 is output to the column line CL01. The reset voltage signals output to the column lines CL00 and CL01 are concurrently sampled in the CDS block 130.

Then, if a charge transmit signal 206 is applied to the gates of the charge transmit transistors TM00 and TM11 through the first charge transmit line TXL00 of the readout circuit RO00 of the odd row ROW0 and the second charge transmit line TXL11 of the readout circuit RO01 of the even row ROW1, a discharge path to the ground is formed through the charge transmit transistor TM00 and the photodiode PD0 so that the level of the shared node FN0 is reduced to the voltage level corresponding to the photo charge having the green color generated in the power supply voltage level. In the same way, a discharge path to the ground is formed through the charge transmit transistor TM11 and the photodiode PD3 so that the level of the shared node FN1 is reduced to the voltage level corresponding to the photo charge having the blue color generated in the power supply voltage level.

A green color sensing signal and a blue color sensing signal, which are sensed by the shared nodes FN0 and FN1, are amplified through the drive transistors DM0 and DM1, and the amplified signals are output to the column lines CL00 and CL01 through the select transistors SM00 and SM11 as output signals 208b and 210b, respectively. The output signals 208b and 210b output to the column lines CL00 and CL01 are concurrently sampled in the CDS block 130.

If a reset pulse signal 212 is applied to the gates of the reset transistors RM0 and RM1 through the reset lines RST0 and RST1 during a second horizontal period, the shared nodes FN0 and FN1 are concurrently charged with a supply voltage. Thus, the drive transistors DM0 and DM1 are turned on so that a reset voltage signal is output to the output nodes NO0 and NO1. Then, if a select signal 214 is applied to the gates of the select transistors SM10 and SM01 through the second select line SEL01 of the readout circuit RO00 of the odd row ROW0 and the first select line SEL10 of the readout circuit RO01 of the even row ROW1, the select transistors SM10 and SM01 are concurrently turned on. Thus, a reset voltage signal 218a of the output node NO1 is output to the column line CL00 and a reset voltage signal 220a of the output node NO0 is output to the column line CL01. The reset voltage signals output to the column lines CL00 and CL01 are concurrently sampled in the CDS block 130.

Then, if a charge transmit signal 216 is applied to the gates of the charge transmit transistors TM10 and TM01 through the second charge transmit line TXL01 of the readout circuit RO00 of the odd row ROW0 and the first charge transmit line TXL10 of the readout circuit RO01 of the even row ROW1, a discharge path to the ground is formed through the charge transmit transistor TM01 and the photodiode PD1 so that the level of the shared node FN0 is reduced to the voltage level corresponding to the photo charge having the blue color generated in the power supply voltage level. In the same way, a discharge path to the ground is formed through the charge transmit transistor TM10 and the photodiode PD2 so that the level of the shared node FN1 is reduced to the voltage level corresponding to the photo charge having the green color generated in the power supply voltage level.

A green color sensing signal and a blue color sensing signal, which are sensed by the shared nodes FN0 and FN1, are amplified through the drive transistors DM0 and DM1, and the amplified signals are output to the column lines CL01 and CL00 through the select transistors SM01 and SM10 as output signals 220b and 218b, respectively. The output signals 220b and 218b output to the column lines CL01 and CL00 are concurrently sampled in the CDS block 130.

The above procedure may be applied to the third row and the fourth row, so that only signals generated from green pixels G00, G02, G04, G06 . . . and Gn are sequentially output to the first column line CL00 and only signals generated from blue pixels B03, B01, B07, B05 . . . and Bn are sequentially output to the second column line CL01.

Therefore, the green colors are exclusively output to the odd column line CL00 and the blue colors are exclusively output to the even colon line CL01 while concurrently reading out the green color pixel row and the blue color pixel row.

Thus, the same color may be output through the same path, so that the color mismatch between rows of the same color may not occur.

In one example embodiment, the blue color may be primarily output from the fourth row and then output from the second row. However, this output sequence may be rearranged in the image sensor 100 or may be rearranged in the DSP 200 after the blue colors have been output.

Figure 5:
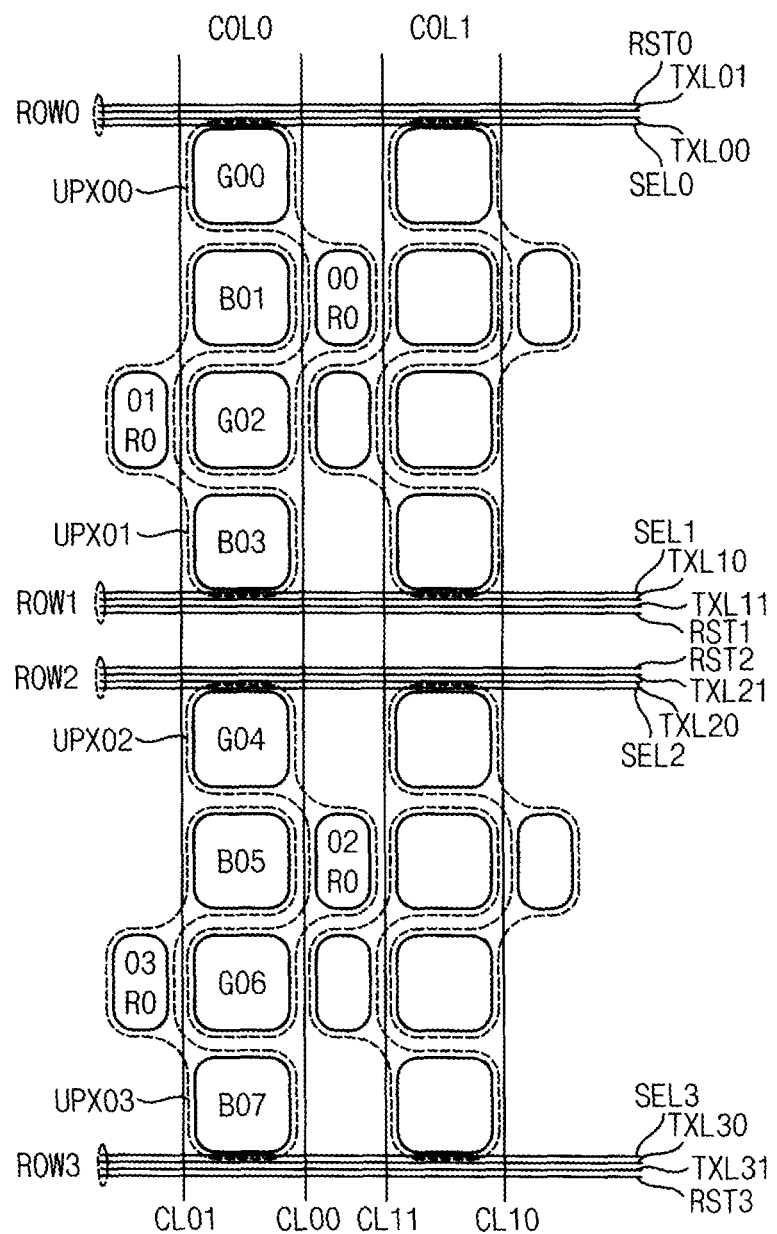
FIG. 5 is a view illustrating a portion of the pixel array unit according to another example embodiment.
Figure 6:
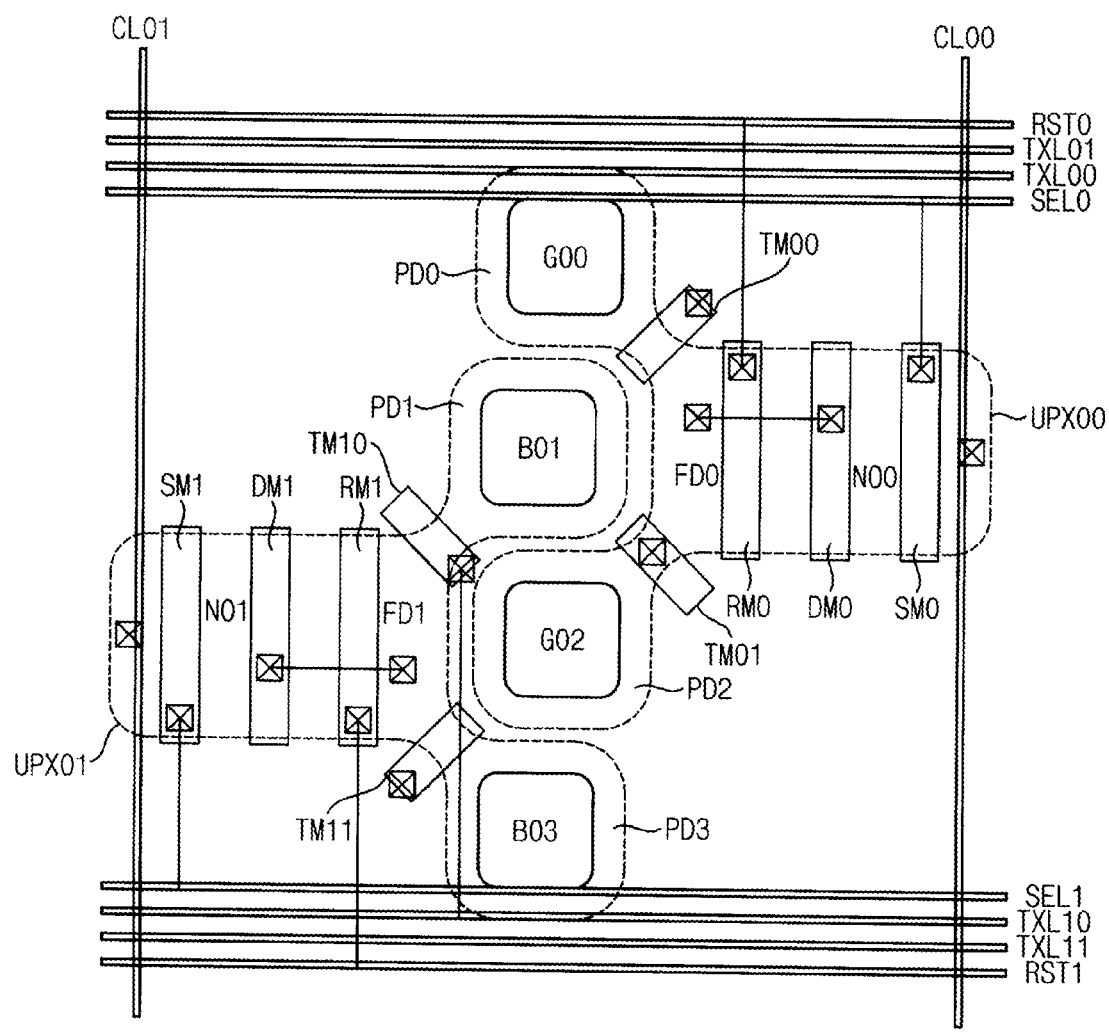
FIG. 6 is a layout view illustrating unit pixel areas of a first row and a second row of FIG. 5.
Figure 7:
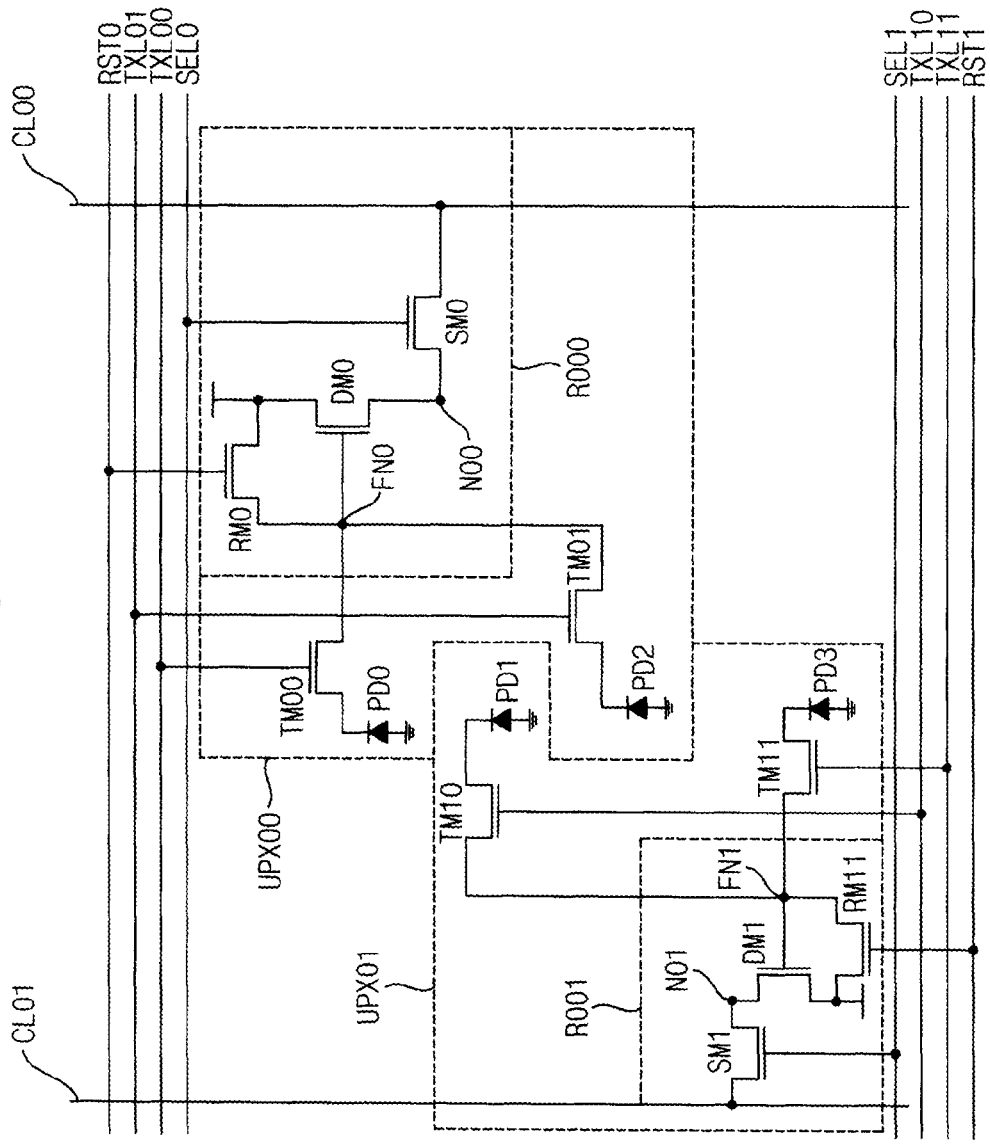
FIG. 7 is a circuit diagram illustrating an equivalent circuit of FIG. 6.

FIG. 5 is a view illustrating a portion of the pixel array unit according to another example embodiment, FIG. 6 is a layout view illustrating unit pixel areas of a first row and a second row of FIG. 5 and FIG. 7 is a circuit diagram illustrating an equivalent circuit of FIG. 6.

Referring to FIG. 5, a first row ROW0 includes a reset line RST0, a first charge transmit line TXL00, a second charge transmit line TXL01, and a select line SEL0. In the same way, a second row ROW1 includes a reset line RST1, a first charge transmit line TXL10, a second charge transmit line TXL11, and a select line SEL1, a third row ROW2 includes a reset line RST2, a first charge transmit line TXL20, a second charge transmit line TXL21, and a select line SEL2, and a fourth row ROW3 includes a reset line RST3, a first charge transmit line TXL30, a second charge transmit line TXL31 and a select line SEL3.

A first column CoL0 includes a first column line CL00 and a second column line CL01 and a second column CoL1 includes a first column line CL10 and a second column line CL11.

Unit pixel areas UPX00 to UPX03 are disposed at intersections between the first column CoL0 and the first to fourth rows ROW0 to ROW3.

The unit pixel area UPX00 includes a green pixel G00, a green pixel G02 and a readout circuit RO00, the unit pixel area UPX01 includes a blue pixel B01, a blue pixel B03 and a readout circuit RO01, the unit pixel area UPX02 includes a green pixel G04, a green pixel G06 and a readout circuit RO02, and the unit pixel area UPX03 includes a blue pixel B05, a blue pixel B07 and a readout circuit RO03.

Referring to FIG. 6, a photodiode PD1 of the unit pixel area UPX01, which is adjacent to the unit pixel area UPX00, is disposed between photodiodes PD0 and PD2 of the unit pixel area UPX00, and a photodiode PD2 of the unit pixel area UPX00 is disposed between photodiodes PD1 and PD3 of the unit pixel area UPX01, which is adjacent to the unit pixel area UPX00.

Referring to FIG. 7, the odd unit pixel area UPX00 includes two photo-electric conversion devices, that is, photodiodes PD0 and PD2. The photodiode PD0 converts light received from the green pixel G00 into a photo charge and the photodiode PD2 converts light received from the green pixel G02 into the photo charge. The photo charge having the green color generated from the photodiode PD0 is transmitted to the readout circuit RO00 through a charge transmit transistor TM00 and the photo charge having the green color generated from the photodiode PD2 is transmitted to the readout circuit RO00 through a charge transmit transistor TM01. The charge transmit transistor TM00 has a gate connected to the first charge transmit line TXL00 and the charge transmit transistor TM01 has a gate connected to the second charge transmit line TXL01, so the charge transmit transistors TM00 and TM01 are selectively switched.

The readout circuit RO00 includes a shared node FN0, a reset transistor RM0, a drive transistor DM0, and a select transistor SM0. The reset transistor RM0 has a source connected to a power supply terminal, a drain connected to the shared node FN0 and a gate connected to the reset line RST0. The drive transistor DM0 has a source connected to the power supply terminal, a drain connected to an output node NO0 and a gate connected to the shared node FN0. The select transistor SM0 has a source connected to the output node NO0, a drain connected to the first column line CL00 and a gate connected to the select line SEL0.

An even unit pixel area UPX01 includes two photo-electric conversion devices, that is, photodiodes PD1 and PD3. The photodiode PD1 converts light received from the blue pixel B01 into a photo charge having a blue color and the photodiode PD3 converts light received from the blue pixel B03 into the photo charge having a blue color. The photo charge having the blue color generated from the photodiode PD1 is transmitted to the readout circuit RO01 through a charge transmit transistor TM10 and the photo charge having the blue color generated from the photodiode PD3 is transmitted to the readout circuit RO01 through a charge transmit transistor TM11. The charge transmit transistor TM10 has a gate connected to the first charge transmit line TXL10 and the charge transmit transistor TM11 has a gate connected to the second charge transmit line TXL11, so the charge transmit transistors TM10 and TM11 are selectively switched.

The readout circuit RO01 includes a shared node FN1, a reset transistor RM1, a drive transistor DM1, and a select transistor SM1. The reset transistor RM1 has a source connected to a power supply terminal, a drain connected to the shared node FN1 and a gate connected to the reset line RST1. The drive transistor DM1 has a source connected to the power supply terminal, a drain connected to an output node NO1 and a gate connected to the shared node FN1. The select transistor SM1 has a source connected to the output node NO1, a drain connected to the second column line CL01 and a gate connected to the select line SEL1.

Figure 8:
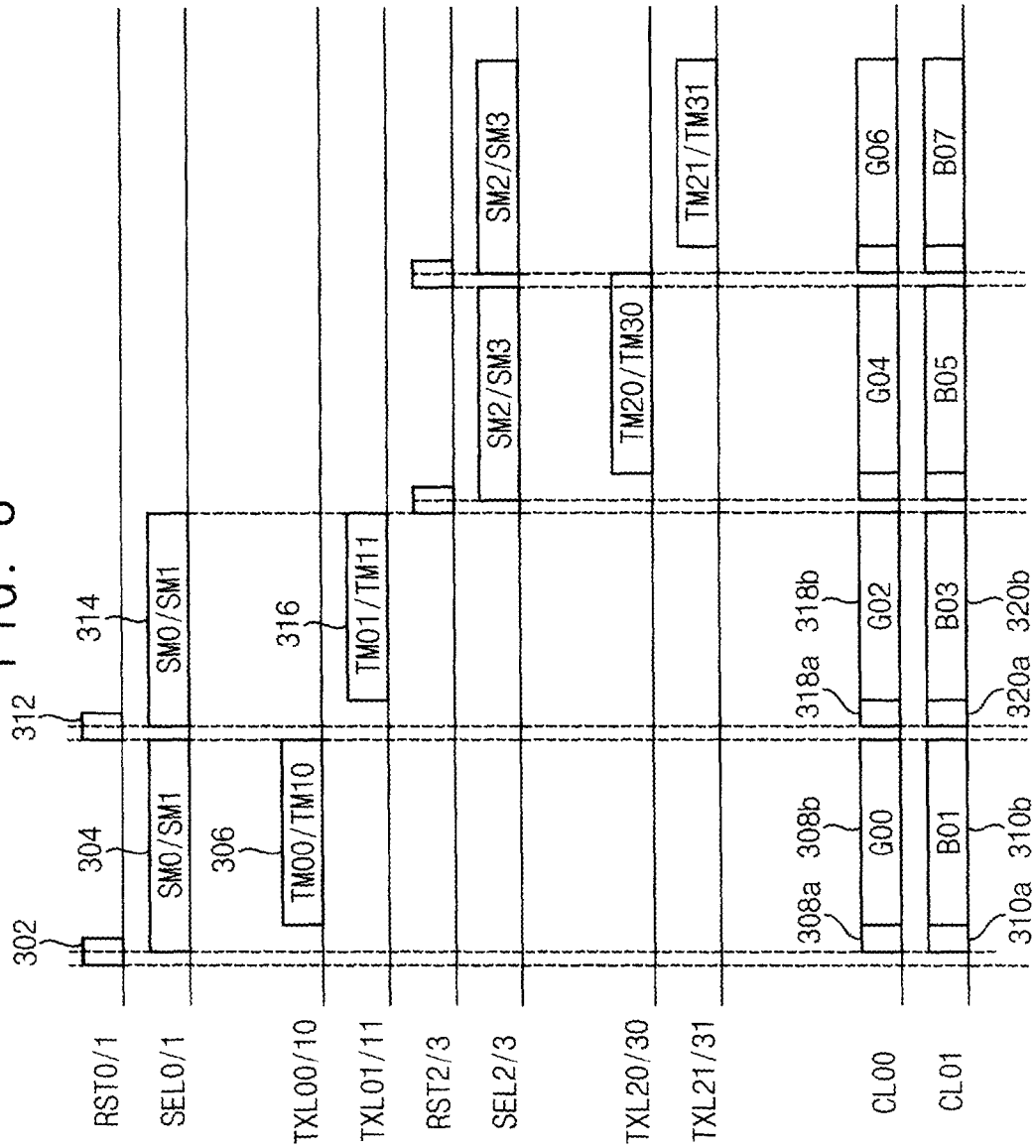
FIG. 8 is an example timing chart to explain example operation of the equivalent circuit of FIG. 7.

FIG. 8 is an example timing chart to explain example operation of the equivalent circuit of FIG. 7.

Referring to FIG. 8, if a reset pulse signal 302 is applied to the gates of the reset transistors RM0 and RM1 through the reset lines RST0 and RST1 during a first horizontal period, the shared nodes FN0 and FN1 are concurrently charged with a supply voltage. Thus, the drive transistors DM0 and DM1 are turned on so that a reset voltage signal is output to the output nodes NO0 and NO1. Then, if a select signal 304 is applied to the gates of the select transistors SM0 and SM1 through the select line SEL0 of the readout circuit RO00 of the odd row ROW0 and the select line SEL1 of the readout circuit RO01 of the even row ROW1, the select transistors SM0 and SM1 are concurrently turned on. Thus, a reset voltage signal 308a of the output node NO0 is output to the column line CL00 and a reset voltage signal 310a of the output node NO1 is output to the column line CL01. The reset voltage signals output to the column lines CL00 and CL01 are concurrently sampled in the CDS block 130.

Then, if a charge transmit signal 306 is applied to the gates of the charge transmit transistors TM00 and TM10 through the first charge transmit line TXL00 of the readout circuit RO00 of the odd row ROW0 and the first charge transmit line TXL10 of the readout circuit RO01 of the even row ROW1, a discharge path to the ground is formed through the charge transmit transistor TM00 and the photodiode PD0 so that the level of the shared node FN0 is reduced to the voltage level corresponding to the photo charge having the green color generated in the power supply voltage level. In the same way, a discharge path to the ground is formed through the charge transmit transistor TM10 and the photodiode PD1 so that the level of the shared node FN1 is reduced to the voltage level corresponding to the photo charge having the blue color generated in the power supply voltage level.

A green color sensing signal and a blue color sensing signal, which are sensed by the shared nodes FN0 and FN1, are amplified through the drive transistors DM0 and DM1, and the amplified signals are output to the column lines CL00 and CL01 through the select transistors SM0 and SM1 as output signals 308b and 310b, respectively. The output signals 308b and 310b output to the column lines CL00 and CL01 are concurrently sampled in the CDS block 130.

If a reset pulse signal 312 is applied to the gates of the reset transistors RM0 and RM1 through the reset lines RST0 and RST1 during a second horizontal period, the shared nodes FN0 and FN1 are concurrently charged with a supply voltage. Thus, the drive transistors DM0 and DM1 are turned on so that a reset voltage signal is output to the output nodes NO0 and NO1. Then, if a select signal 314 is applied to the gates of the select transistors SM0 and SM1 through the select line SEL0 of the readout circuit RO00 of the odd row ROW0 and the select line SEL1 of the readout circuit RO01 of the even row ROW1, the select transistors SM0 and SM1 are concurrently turned on. Thus, a reset voltage signal 318a of the output node NO1 is output to the column line CL00 and a reset voltage signal 320a of the output node NO0 is output to the column line CL01. The reset voltage signals output to the column lines CL00 and CL01 are concurrently sampled in the CDS block 130.

Then, if a charge transmit signal 316 is applied to the gates of the charge transmit transistors TM01 and TM11 through the second charge transmit line TXL01 of the readout circuit RO00 of the odd row ROW0 and the second charge transmit line TXL11 of the readout circuit RO01 of the even row ROW1, a discharge path to the ground is formed through the charge transmit transistor TM01 and the photodiode PD2 so that the level of the shared node FN0 is reduced to the voltage level corresponding to the photo charge having the green color generated in the power supply voltage level. In the same way, a discharge path to the ground is formed through the charge transmit transistor TM11 and the photodiode PD3 so that the level of the shared node FN1 is reduced to the voltage level corresponding to the photo charge having the blue color generated in the power supply voltage level.

A green color sensing signal and a blue color sensing signal, which are sensed by the shared nodes FN0 and FN1, are amplified through the drive transistors DM0 and DM1, and the amplified signals are output to the column lines CL00 and CL01 through the select transistors SM0 and SM1 as output signals 318b and 320b, respectively. The output signals 318b and 320b output to the column lines CL00 and CL01 are concurrently sampled in the CDS block 130.

The above procedure may be applied to the third row and the fourth row, so that only signals generated from green pixels G00, G02, G04, G06 . . . and Gn are sequentially output to the first column line CL00 and only signals generated from blue pixels B01, B03, B05, B07 . . . and Bn are sequentially output to the second column line CL01.

Therefore, the green colors are exclusively output to the odd column line CL00 and the blue colors are exclusively output to the even colon line CL01 while concurrently reading out the green color pixel row and the blue color pixel row.

Thus, the same color may be output through the same path, so that the color mismatch between rows of the same color may not occur.

In the example embodiment described with reference to FIGS. 5 and 8, the blue color and the green color are sequentially output without the change of output sequence. Thus, different from the example embodiment described with reference to FIGS. 2 to 4, the rearrangement of the blue color may not be necessary.

FIG. 9 is a block diagram illustrating a computing system and an interface used in the computing system according to an example embodiment.

Referring to FIG. 9, a computing system 1000 may be implemented by a data processing device (e.g., a cellular phone, a personal digital assistant, a portable multimedia player, a smart phone, etc.) that uses or supports a mobile industry processor interface (MIPI) interface. The computing system 1000 may include an application processor 1010, an image sensor 1040, a display device 1050, etc.

A CSI host 1012 of the application processor 1010 may perform a serial communication with a CSI device 1041 of the image sensor 1040 via a camera serial interface (CSI). In some example embodiments, the CSI host 1012 may include a deserializer (DES), and the CSI device 1041 may include a serializer (SER). A DSI host 1011 of the application processor 1010 may perform a serial communication with a DSI device 1051 of the display device 1050 via a display serial interface (DSI). In some example embodiments, the DSI host 1011 may include a serializer (SER), and the DSI device 1051 may include a deserializer (DES).

The computing system 1000 may further include a radio frequency (RF) chip 1060 performing a communication with the application processor 1010. A physical layer (PHY) 1013 of the computing system 1000 and a physical layer (PHY) 1061 of the RF chip 1060 may perform data communications based on a MIPI DigRF. The application processor 1010 may further include a DigRF MASTER 1014 that controls the data communications according to the MIPI DigRF of the PHY 1061, and the RF chip 1060 may further include a DigRF SLAVE 1062 controlled by the DigRF MASTER 1014.

The computing system 1000 may further include a global positioning system (GPS) 1020, a storage 1070, a MIC 1080, a DRAM device 1085, and a speaker 1090. In addition, the computing system 1000 may perform communications using an ultra wideband (UWB) 1110, a wireless local area network (WLAN) 1100, a worldwide interoperability for microwave access (WIMAX) 1030, etc. However, the structure and the interface of the computing system 1000 are not limited thereto.

The foregoing is illustrative of the present inventive concepts and is not to be construed as limiting thereof. Although a few example embodiments have been described, those skilled in the art will readily appreciate that many modifications are possible in the example embodiments without materially departing from the novel teachings and advantages of the present inventive concepts. Accordingly, all such modifications are intended to be included within the scope of the present inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An image sensor comprising:
   a pixel array including a plurality of unit pixel areas arranged in a plurality of rows and columns; and
   a plurality of pairs of column lines, each pair of column lines being aligned with a column among the plurality of columns,
   wherein each of the plurality of unit pixel areas includes,
      a readout circuit connected to a corresponding pair of column lines, and
      first and second photo-electric conversion devices sharing the readout circuit; and
   wherein each of the plurality of unit pixel areas is configured to,
      output, through a first column line among the corresponding pair of column lines, a first pixel signal corresponding to a first photoelectron generated by the first photo-electric conversion device, and
      output, through a second column line among the corresponding pair of column lines, a second pixel signal corresponding to a second photoelectron generated by the second photo-electric conversion device.

2. The image sensor of claim 1, wherein the first photoelectron corresponds to a first color, and the second photoelectron corresponds to a second color, which is different from the first color.

3. The image sensor of claim 2, wherein each readout circuit aligned in an odd row among the plurality of rows is configured to output the first pixel signal through the first column line in response to an odd readout signal, and each readout circuit aligned in an even row among the plurality of rows is configured to output the second pixel signal through the second column line in response to the odd readout signal.

4. The image sensor of claim 2, wherein each readout circuit aligned in an even row among the plurality of rows is configured to output the first pixel signal through the first column line in response to an even readout signal, and each readout circuit aligned in an odd row among the plurality of rows is configured to output the second pixel signal through the second column line in response to the even readout signal.

5. The image sensor of claim 2, wherein each unit pixel area aligned in an odd row among the plurality of rows comprises:
   a first charge transmit transistor configured to transmit a photo charge generated by the first photo-electric conversion device to a shared node when an odd readout operation is performed; and
   a second charge transmit transistor configured to transmit a photo charge generated by the second photo-electric conversion device to the shared node when an even readout operation is performed.

6. The image sensor of claim 5, wherein the readout circuit included in each unit pixel area aligned in the odd row among the plurality of rows comprises:
   a reset transistor configured to reset the shared node with a supply voltage in response to a reset signal;
   a drive transistor configured to drive an output node based on quantity of charges at the shared node;
   a first select transistor configured to connect the output node to the first column line in response to an odd readout signal; and
   a second select transistor configured to connect the output node to the second column line in response to an even readout signal.

7. The image sensor of claim 2, wherein each unit pixel area aligned in an even row among the plurality of rows comprises:
   a first charge transmit transistor configured to transmit a photo charge generated by the first photo-electric conversion device to a shared node when an even readout operation is performed; and
   a second charge transmit transistor configured to transmit a photo charge generated by the second photo-electric conversion device to the shared node when an odd readout operation is performed.

8. The image sensor of claim 7, wherein the readout circuit included in each unit pixel area aligned in the even row among the plurality of rows comprises:
   a reset transistor configured to reset the shared node with a supply voltage in response to a reset signal;
   a drive transistor configured to drive an output node based on quantity of charges at the shared node;
   a third select transistor configured to connect the output node to the first column line in response to an even readout signal; and
   a fourth select transistor configured to connect the output node to the second column line in response to an odd readout signal.

9. A unit pixel having a shared pixel structure, the unit pixel comprising:
   a first photo-electric conversion device configured to generate a first pixel signal corresponding to a first color;
   a second photo-electric conversion device configured to generate a second pixel signal corresponding to a second color, which is different from the first color; and
   a readout circuit connected to the first and second photo-electric devices, the readout circuit being configured to output the first pixel signal and the second pixel signal via different column lines.

10. The unit pixel of claim 9, wherein the first and second photo-electric conversion devices share the readout circuit.

11. The unit pixel of claim 9, wherein the unit pixel includes only a single readout circuit.

12. An image sensor comprising:
   a pixel array including a plurality of unit pixels arranged in a plurality of rows and columns, each of the plurality of unit pixels having a shared pixel structure, and each of the plurality of unit pixels including
      a first photo-electric conversion device configured to generate a first pixel signal corresponding to a first color,
      a second photo-electric conversion device configured to generate a second pixel signal corresponding to a second color, which is different from the first color, and
      a readout circuit connected to the first and second photo-electric devices, the readout circuit being configured to output the first pixel signal and the second pixel signal via different column lines;
   a plurality of pairs of column lines, each pair of column lines being aligned with a column among the plurality of columns; and
   wherein the readout circuit is configured to output the first pixel signal via the first column line among a corresponding pair of column lines, and to output the second pixel signal via the second column line among the corresponding pair of column lines.

13. The image sensor of claim 12, wherein the readout circuit is configured to output the first pixel signal only via the first column line, and to output the second pixel signal only via the second column line.

* * * * *